US007486287B2

(12) United States Patent
Kim et al.

(10) Patent No.: US 7,486,287 B2
(45) Date of Patent: Feb. 3, 2009

(54) NANO-LIQUID CRYSTAL ON SILICON (LCOS) CHIP HAVING REDUCED NOISE

(75) Inventors: Gihong Kim, Milpitas, CA (US); Tae Soo Chun, Los Gatos, CA (US)

(73) Assignees: Sysview Technology, Inc., San Jose, CA (US); Wuhan Splendid Optronics Technology Co. Ltd. (CN)

(*) Notice: Subject to any disclaimer, the term of this patent is extended or adjusted under 35 U.S.C. 154(b) by 324 days.

(21) Appl. No.: 11/504,915

(22) Filed: Aug. 15, 2006

(65) Prior Publication Data

US 2007/0046885 A1    Mar. 1, 2007

Related U.S. Application Data

(60) Provisional application No. 60/710,993, filed on Aug. 23, 2005.

(51) Int. Cl.
   *G09G 5/00* (2006.01)
(52) U.S. Cl. .............................. 345/205; 345/58; 345/87; 345/204
(58) Field of Classification Search .................. 345/58, 345/87–104, 204–215, 690–699; 349/153–156
   See application file for complete search history.

(56) References Cited

U.S. PATENT DOCUMENTS

| 6,122,033 | A | 9/2000 | Mathew et al. |
| 6,326,958 | B1 | 12/2001 | Gorny et al. |
| 2003/0007117 | A1 | 1/2003 | McKnight et al. |
| 2005/0162727 | A1* | 7/2005 | Ishii et al. .................... 359/245 |
| 2006/0286698 | A1* | 12/2006 | Kurashina .................... 438/29 |
| 2007/0087534 | A1* | 4/2007 | Yasukawa .................... 438/478 |

FOREIGN PATENT DOCUMENTS

JP    64000925    1/1989

OTHER PUBLICATIONS

Wei B.Q. et al., "*Growing Pillars of Densely Packed Carbon Nanotubes on Ni-Coated Silica*", vol. 40, No. 1, Jan. 2002, pp. 47-51.
Kazlas P.T. et al., "*Miniature Liquid-Crystal-on-Silicon Display Assembly*", Optics Letters, OSA, Optical Society of America, Washington D.C., US, vol. 23, No. 12, Jun. 15, 1998, pp. 972-974.

* cited by examiner

*Primary Examiner*—Vijay Shankar
(74) *Attorney, Agent, or Firm*—Joe Zheng

(57) ABSTRACT

An LCoS chip is designed to suppress electrical noise due to cross-talk between electrical components of the chip and stray light entered into the chip. The LCoS chip includes a silicon substrate having an array of memory cells formed the substrate. The chip includes a first polycrystalline silicon layer that forms word lines and a metal layer that forms bit lines, wherein bit lines are directed orthogonal to the word lines. The chip also includes capacitor storages formed on second and third second polycrystalline silicon layers. The second polycrystalline layer is disposed over the first polycrystalline silicon layer and over regions of the substrate not covered by the word lines. The metal layer includes shields to reduce cross-talk between neighboring bit lines as well as between the bit lines and the capacitor storages. A third polycrystalline layer is configured to reduce cross-talk between the bit lines and the word lines.

16 Claims, 7 Drawing Sheets

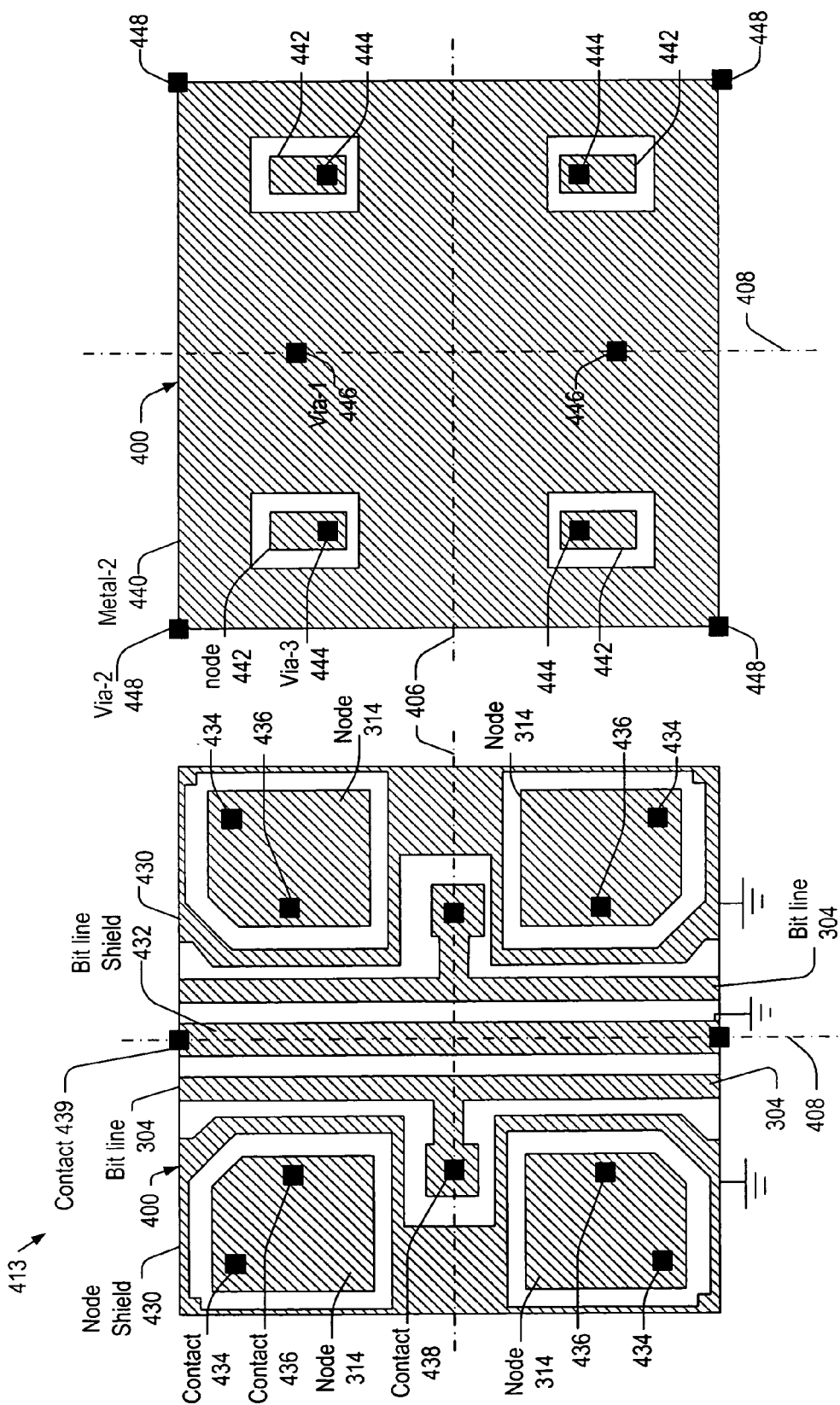

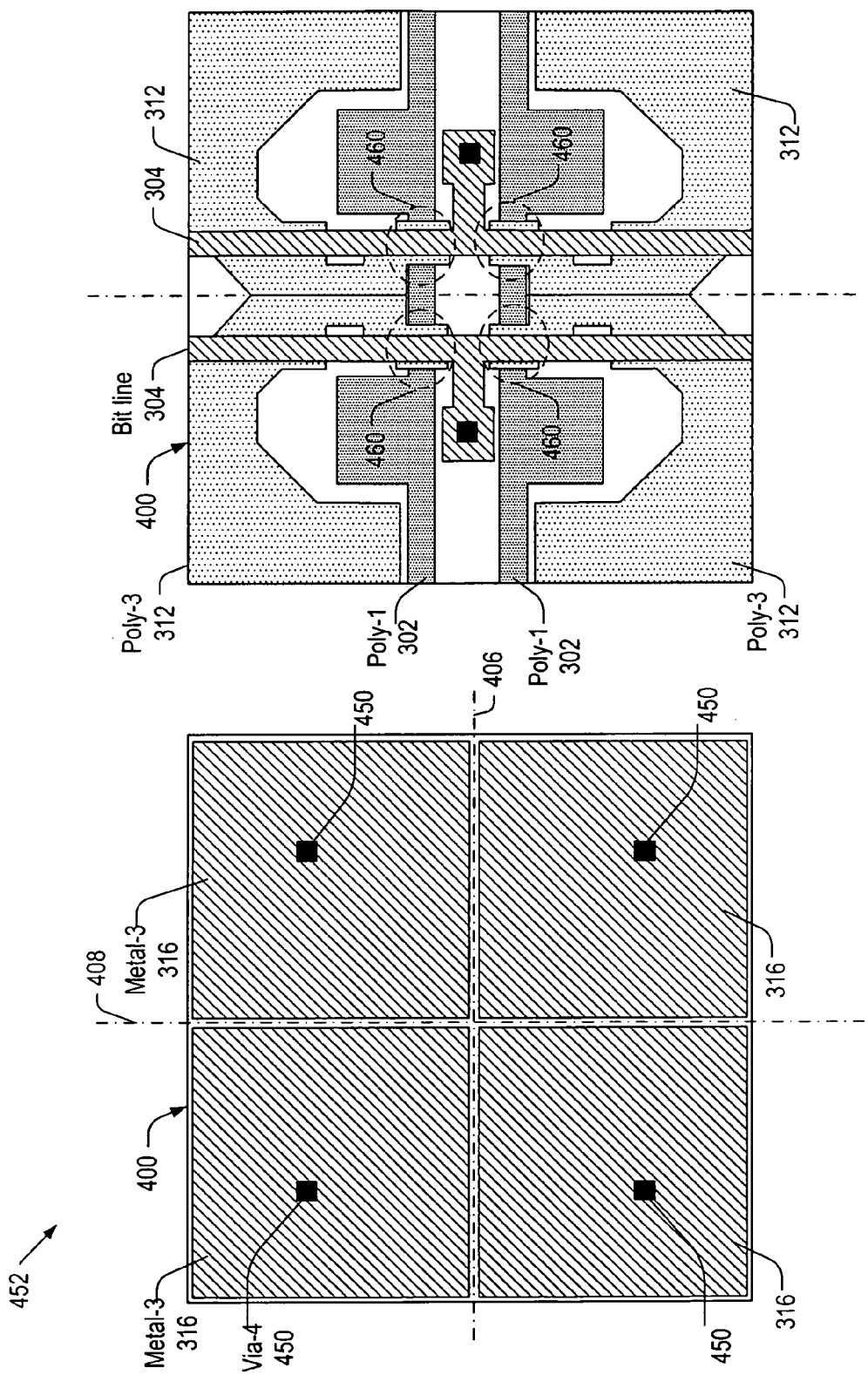

NANO-LIQUID CRYSTAL ON SILICON (LCOS) CHIP HAVING REDUCED NOISE

CROSS REFERENCE TO RELATED APPLICATIONS

This application claims the benefit of U.S. Provisional Application No. 60/710,993, entitled "Nano-Liquid Crystal on Silicon (LCoS) Chip Having Reduced Noise," filed on Aug. 23, 2005, which is incorporated herein by reference in its entirety.

FIELD OF THE INVENTION

The present invention relates to semiconductor chip design, and more particularly to design of liquid crystal on silicon (LCoS) cells.

BACKGROUND OF THE INVENTION

Micro-display devices having LCoS structures (or, equivalently LCoS devices) are becoming increasingly prevalent in various micro-display applications, such as big-screen TVs, PC monitors, projectors, etc. Typically, an LCoS device has a semiconductor substrate and a liquid crystal positioned on the substrate, where the light passed through the liquid crystal may be magnified by a suitable optical system to display images formed on the liquid crystal for human eyes.

In general, vitally important elements to generate a good LCoS image are contrast, brightness, and resolution. Resolution may be determined by the number of pixels within an image. Currently, there is a number of resolution standards defined for various electronic applications. For example, a conventional high-definition TV (HDTV) screen may have 1,920 and 1,080 scan lines in the horizontal and vertical directions, respectively. In general, higher resolution may yield better image quality. Brightness refers to the backlight luminescence of an LCoS image. For a given contrast and resolution, the image sharpness may be enhanced by increasing the brightness of the image. Contrast or contrast ratio refers to the ratio of luminance between the brightest white that can be produced and the darkest black that can be produced. Contrast ratio is the major determinant of perceived picture quality: if an image has a high contrast ratio, viewers will judge it to be sharper than a picture with a lower contrast ratio, even if the lower contrast picture has a substantially higher resolution.

Thus, one approach to improve the image quality for an LCoS device may be increasing the resolution, i.e., increasing the number of pixels for impressing the image on the liquid crystal. In general, the size of each pixel may decrease as the resolution increases, which increases spatial proximity between two neighboring pixels and circuit elements within the LCoS device chip. The increases spatial proximity may induce an electrical noise that stems from cell-to-cell cross-talk or coupling effect between the circuit elements. In general, conventional non-LCoS semiconductor chips do not use high voltage signals and thus the electrical noise may not be significant. In contrast, a typical LCoS micro-display device chip may require high voltage signals to form images in the liquid crystal. When the high voltage signals transmit through the circuit elements, the electrical cross-talk or coupling effect may reach a significant level. As a consequence, the major technical challenge in this approach may be how to suppress the electrical cross-talk and/or coupling effect.

Another approach to improve image quality may be increasing the contrast ratio and/or controlling the contrast grey scale in a precise manner. To display an image, a typical LCD device may split the time domain into a number of frames or intervals. Then, the polarity of voltage applied to each pixel may alternate at the frames, wherein the magnitude of the voltage determines the grey level of the pixel's image. By way of example, a red color may be displayed in 10-bit resolution at the peak-to-peak voltage Vpp of 10 volts. Then, the voltage applied to a pixel may have a resolution of 0.0049 ($=10/2^{10}$) volts in the grey scale. Thus, if the circuit elements have a voltage leak of few milli-volts, the intended red color may not be generated, i.e., a color degraded toward the white may be displayed. As one of the major sources for the voltage leak may be the cross-talk between two neighboring circuit elements and/or cell-to-cell cross talk, the major challenge of this approach would be also how to reduce the electrical cross-talk and/or coupling effect.

The semiconductor chip portion of an LCoS device may have another source of electrical noise: stray light. The stray light noise may be induced by light unintentionally entered into the chip. The stray light may generate electron and hole pairs that are typically converted into electrical noise, which in turn produces the similar effect as the cross-talk and/or coupling.

In view of the above, it would be desirable to design a circuit with reduced electrical noise. Moreover, as the pixel memory capacity for commercial display devices expands at a considerable rate and, as a consequence, each pixel size may decrease rapidly, there is a strong need for an LCoS chip layout that suppresses the electrical noise.

SUMMARY

The present invention provides an LCoS chip designed to suppress electrical noise that stems from cross-talk between the electrical components of the chip and stray light entered into the chip. The LCoS chip includes multiple polycrystalline layers and metal layers disposed over a silicon substrate and configured to minimize the noise, wherein filling layers are interposed between these layers.

In one aspect of the present invention, a liquid crystal on silicon (LCoS) chip includes: a silicon substrate having an array of memory cells formed thereon; the first polycrystalline silicon layer disposed over the silicon substrate and forming word lines extending in parallel across the memory cells; a metal layer disposed above the first polycrystalline silicon layer and forming bit lines extending in parallel across the memory cells, the bit lines being directed orthogonal to the word lines; and the second polycrystalline silicon layer disposed between the first polycrystalline silicon layer and the metal layer and having shield portions located between the intersections of the bit lines and word lines, whereby cross-talk between the word lines and the bit lines is reduced by the shield portions.

In another aspect of the present invention, a liquid crystal on silicon (LCoS) chip includes: a silicon substrate having an array of memory cells formed thereon; and a metal layer deposited over the silicon substrates and including bit lines and bit line shields, each of the bit line shields reducing cross-talk between neighboring two bit lines.

In still another aspect of the present invention, a liquid crystal on silicon (LCoS) chip includes: a silicon substrate having an array of memory cells formed thereon, each memory cell including an N-active and a P-active; a first polycrystalline silicon layer disposed over the silicon substrate forming a plurality of word lines extending in parallel across the memory cells; a second polycrystalline silicon layer disposed over the first polycrystalline silicon layer and forming a plurality of first capacitor plates disposed above regions of the substrate not covered by the word lines; a third polycrystalline silicon layer disposed over the second polycrystalline silicon layer and including a plurality of second capacitor plates disposed above the first capacitor plates, the first and second capacitor plates forming capacitor storage nodes of the memory cells; a first metal layer disposed above the third polycrystalline silicon layer and forming a plurality of bit lines extending in parallel across the memory cells, the bit lines being directed orthogonal to the word lines, the first metal layer including a plurality of node shields and a plurality of first connecting nodes that is coupled to the second polycrystalline silicon layer and the N-actives, each of the node shields surrounding one of the first connecting nodes to reduce cross-talk between the bit lines and the capacitor storage nodes, the first metal line further including a plurality of bit line shields for reducing cross-talk between the bit lines; the third polycrystalline silicon layer including shield portions located between the intersections of the bit lines and word lines thereby reducing cross-talk therebetween; a second metal layer for blocking stray light entered into the memory cells and including a plurality of second connecting nodes, each of the second connecting nodes being coupled to one of the first connecting nodes; and a third metal layer for applying electrical potentials to liquid crystal located over the memory cells and thereby forming an image in the liquid crystal, the third metal layer including a plurality of contacts for connecting the third metal layer to the second connecting nodes.

BRIEF DESCRIPTION OF THE DRAWINGS

FIG. 4E is a top view of a Metal-1 layer formed over the Poly-3 layer in FIG. 4D in accordance with the present invention;

FIG. 4F is a top view of a Metal-2 layer formed over the Metal-1 layer in FIG. 4E in accordance with the present invention;

FIG. 4G is a top view of a Metal-3 layer formed over the Metal-2 layer in FIG. 4F in accordance with the present invention; and FIG. 4H is a top view of the Poly-1, Poly-3 and Metal-1 layers depicted in FIGS. 4B, 4D and 4E, respectively.

DETAILED DESCRIPTION OF THE INVENTION

Figure 1:
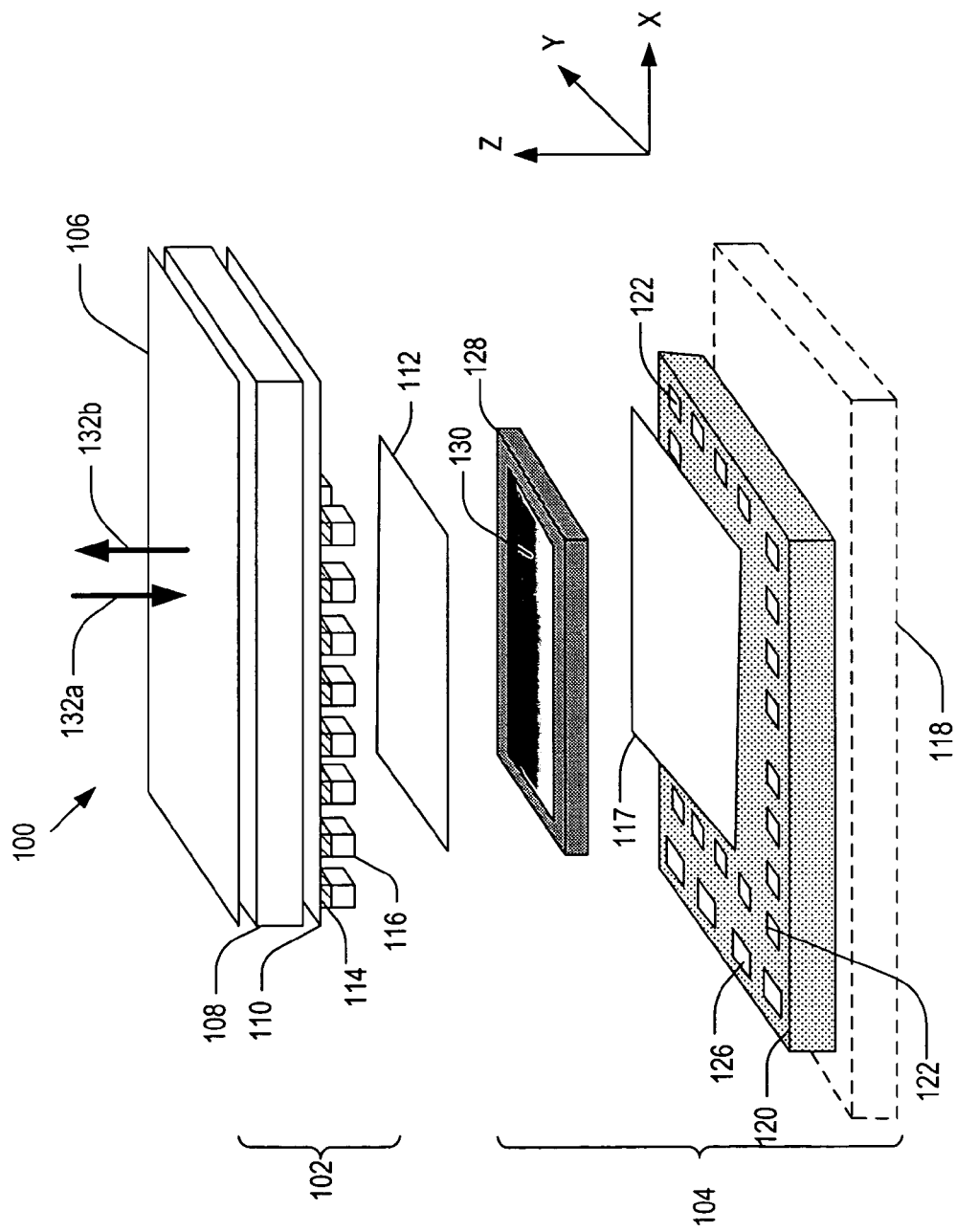
FIG. 1 is an exploded perspective view of a Nano-LCoS chip according to the present invention.

Referring now to FIG. 1, FIG. 1 is an exploded perspective view of a Nano-LCoS chip shown at 100 according to the present invention. As illustrated, the Nano-LCoS chip may include a glass portion (or equivalently, glass side) 102 and a silicon portion 104. The glass portion 102 may include: a glass 108, preferably made of quartz, fused silica or high temperature glass; an anti-reflection (AR) layer 106 for protecting the glass 108 from mechanical damages and reducing reflection of the incoming light 132a from the top surface of the glass 108; an Indium Tin Oxide (ITO) layer 110; a top inorganic alignment layer 112, preferably made of silicon dioxide, being in contact with liquid crystal 130 and preventing the ITO layer 110 from reacting with the liquid crystal 130; and carbon nanotube (CNT) pillars or columns 116 grown on a metal seed layer 114. In an alternative embodiment, a thin CNT layer with a high level of transparency may be used in place of the ITO layer 110. The thin CNT layer may be highly adhesive to the CNT pillars 116 and, as a consequence, provide enhanced mechanical bond strength to the CNT pillars 116.

The CNT pillars 116 may be grown on the metal seed layer 114 that is formed on the glass 108 in advance. Subsequently, the ITO layer 110 and inorganic alignment layer 112 may be deposited over the entire surface of the glass 108.

The silicon portion 104 may include: a silicon chip 120 including a circuit that has polycrystalline layers and metal layers (these layers will be explained in detail with reference to FIGS. 4A-4H); CNT counterparts or females 122 for receiving the CNT pillars 116; pads 126 for communicating electrical signals in and out of the circuit in the silicon chip 120; a passivation layer (not shown in FIG. 1 for simplicity) formed on the surface of the silicon chip 120; and a bottom inorganic alignment layer 117 formed on the passivation layer. The liquid crystal 130 may be contained in the space defined by a liquid crystal glue layer 128, the top inorganic alignment layer 112 and the bottom inorganic alignment layer 117. Optionally, the silicon chip 120 may be mounted on a substrate 118 that provides additional mechanical strength. A detailed description of the Nano-LCoS chip 100 is found in U.S. patent application Ser. No. 11/224,912, entitled "Carbon NanoTube Technology in Liquid Crystal on Silicon MicroDisplay", filed on Sep. 12, 2005, which is hereby incorporated herein by reference in its entirety.

As illustrated in FIG. 1, the incoming light 132a may pass through the layers in the glass portion 102 and the liquid crystal 130. A portion of the liquid crystal 130 may be located over a pixel area 202 (shown in FIG. 2) that includes a pixel array, which preferably includes 1920×1080 pixels, and form an image when subject to a voltage difference between the ITO layer 110 and the pixel area 201. The incoming light 132a may pass through the image, reflect from the top surface of the silicon chip 120 and pass through the image again. Then, the light 132b carrying the information of the image may pass through the glass portion 102 again and leave the Nano-LCoS chip 100.

Figure 2:
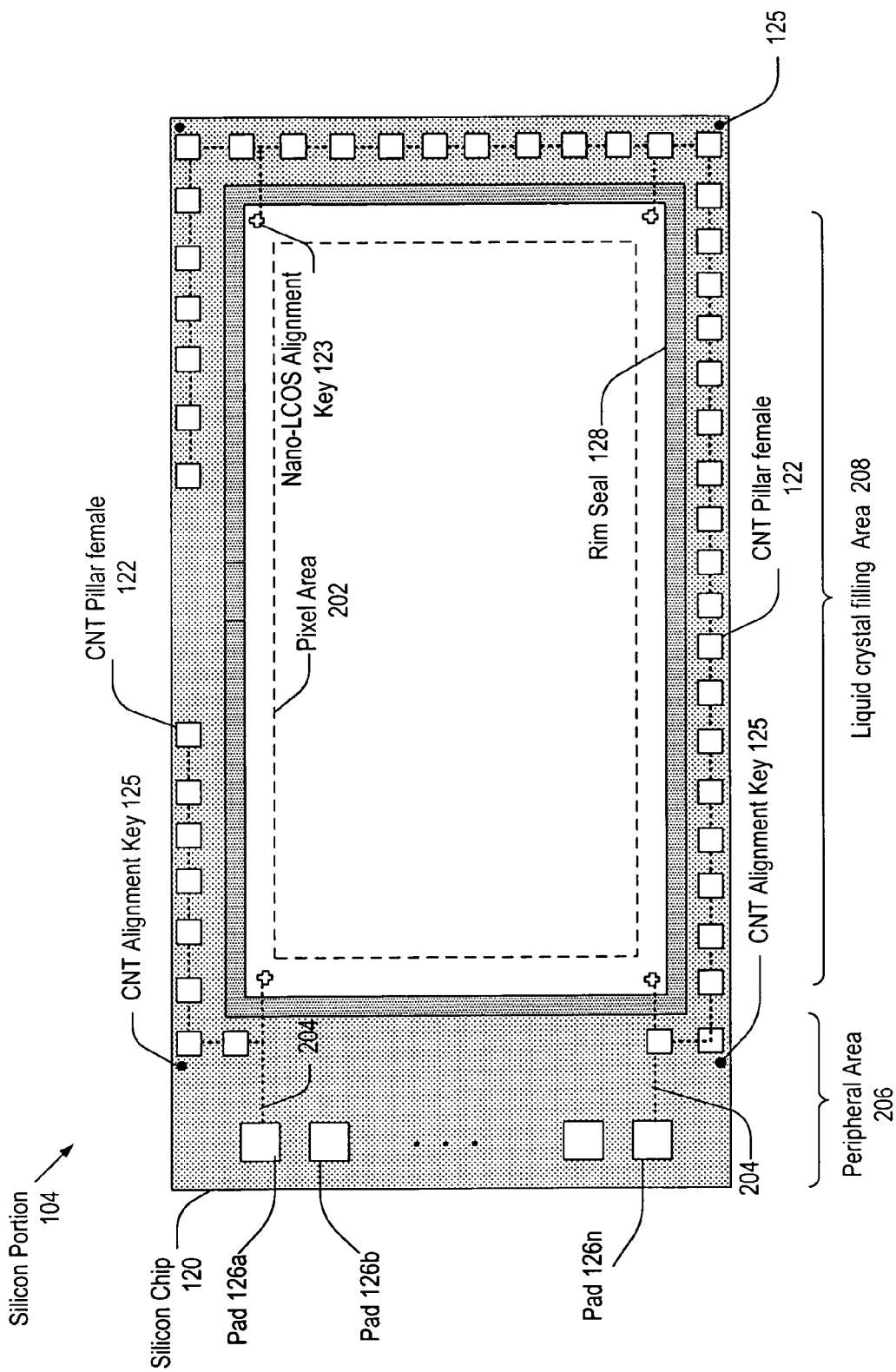
FIG. 2 is a top view of the silicon portion of the Nano-LCoS chip depicted in FIG. 1.

FIG. 2 is a top view of the silicon portion 104 depicted in FIG. 1. As illustrated, the CNT counterparts or CNT pillar female 122 may be electrically connected to ITO voltage (VITO) pads 126a and 126n via connection mechanisms 204, where the VITO pads 126a and 126n may be connected to an electrical source that can provide an electrical potential of VITO. Each CNT pillar 116, being an excellent electrical conductor, may form a portion of the electrical connection from the VITO pads 126a and 126n to the ITO layer 110. VITO may be used to control the voltage applied to the ITO layer 110 and thereby to the top surface of the liquid crystal.

The Nano-LCoS chip 100 may operate to form an image in one color. Typically, three of the Nano-LCoS chips may be needed to visualize the image in full color for human eyes. To align the three Nano-LCoS chips with respect to each other, Nano-LCoS alignment keys 123 may be used, where the keys 123 may be connected to the VITO pads 126a and 126n. As illustrated in FIG. 2, the alignment keys 123 are located over the liquid crystal 130. By applying VITO to the keys 123 (more specifically, by applying a voltage difference of VITO between the ITO layer 110 and the top metal layer of the silicon chip 120), a portion of the liquid crystal 130 may become transparent, i.e., the optical alignment keys 123 become visible. The keys 123 may be formed on the silicon chip 120. The CNT alignment keys 125, where each key has a pair of marks on both the glass portion 102 (not shown in FIG. 2) and the silicon chip 120, may be used to align the glass portion 102 with respect to the silicon chip 120 during the process of combining or mating the two portions. The silicon chip 120 may include a peripheral area 206 and a liquid crystal filling area 208. The liquid crystal filling area 208 may include a pixel area 202 under which an array of pixels is located. The pixel layout is described in connection with FIGS. 3-4H.

Figure 3:
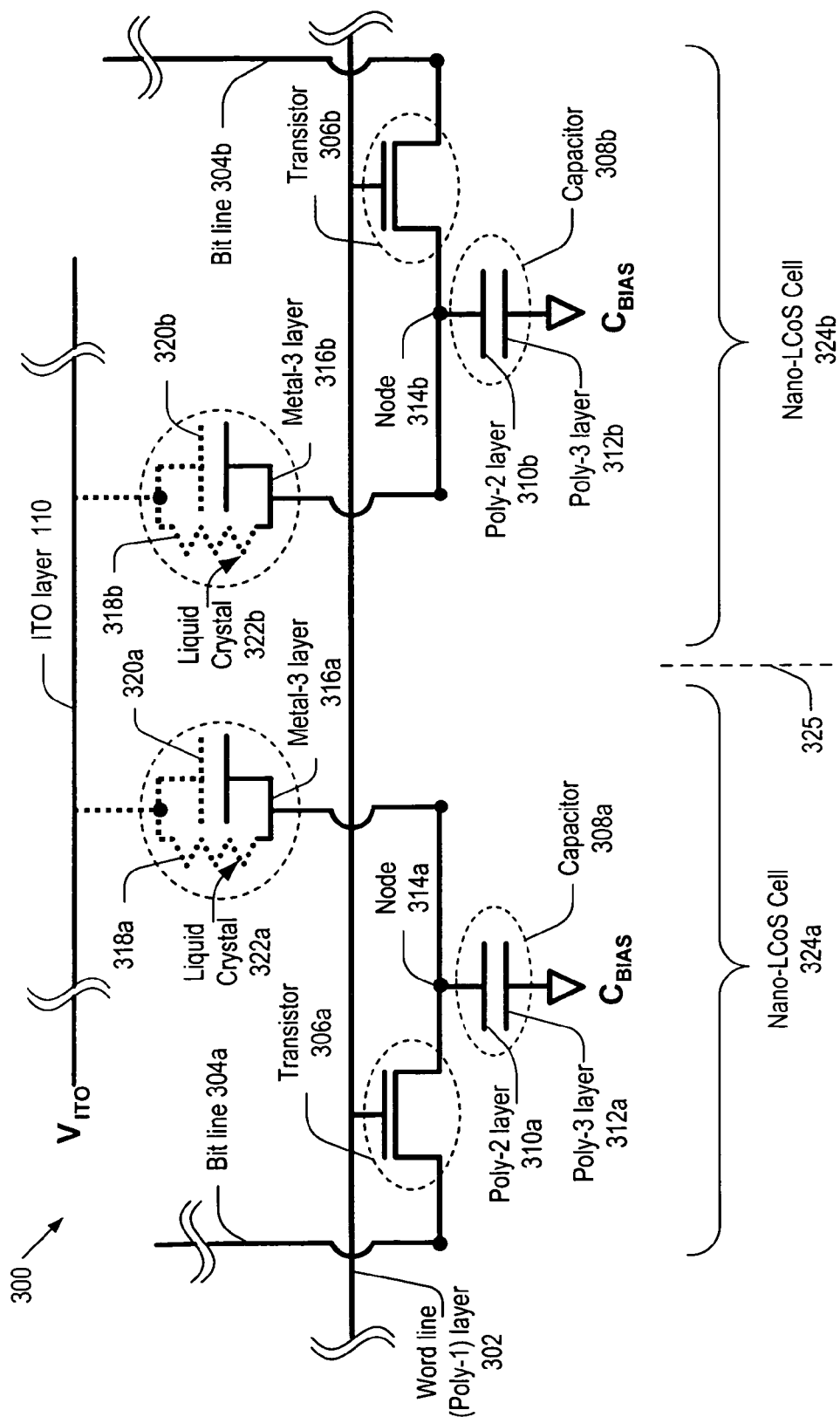
FIG. 3 is an equivalent circuit diagram of Nano-LCoS cells included in the silicon chip depicted in FIG. 1.

FIG. 3 is an equivalent circuit diagram of two neighboring Nano-LCoS cells 324a and 324b in accordance with the present invention. In FIG. 3, solid lines are used to represent circuit elements in the two cells 324a-324b, while broken lines are used to represent a portion of liquid crystal 322 controlled by each cell. The layout of the two cells 324a and 324b may be symmetric with respect to a line 325. Thus, for simplicity, only one cell 324a is explained hereinafter.

The cell 324a may be represented by a pair of transistor 306a and capacitor 308a. Poly-1 layer (or, shortly, Poly-1) 302 may function as a word line and connected to the gates of the transistors 306a and 306b. Ploy-1 layer 302 may be further connected to other transistors. The capacitor 308a may consist of Poly-2 (layer) 310a and Poly-3 (layer) 312a. Poly-1 302, Poly-2 310a, and Poly-3 312a may be made of conventional polycrystalline silicon. A bit line 304a may be included in Metal-1 layer 431 (shown in FIG. 4E) and coupled to the transistor 306a. Poly-2 layer 310a may be also coupled to the transistor 306a at the node point 314a. As will be explained in connection with FIG. 4E, the node point 314a may be realized as a polygonal element of the Metal-1 layer 431.

A portion of liquid crystal 322a may be controlled by the cell 324a to form a portion of an image, where the portion of liquid crystal 322a may be equivalent to and represented by a pair of resistor 318a and capacitor 320a. The Metal-3 layer 316a (detailed later with reference to FIG. 4G) of the cell 324a may form bottom plate of the capacitor 320a, where the Metal-3 layer 316a is connected to the node 314a. The liquid crystal 322a may form an image when subject to a voltage difference between the Metal-3 316a and the ITO layer 110 (FIG. 1) that has an electric potential of VITO. The cells 324a and 324b may be formed by conventional semiconductor growth techniques. The functions and shapes of the circuit elements contained in the cell 324a will be explained in connection with FIGS. 4A-4B.

As mentioned, two sources of noise, cross-talk and stray light, are known to be significant to the LCoS silicon chip 120. The cross-talk and/or coupling collectively refers to the electrical coupling between neighboring cells as well as the electrical interference between circuit elements within the cell 324. The silicon chip 120 may require high voltage signal (VITO) to form images in the liquid crystal 130. When high voltage signals are transmitted through the circuit elements of the chip 120, the cross-talk and/or coupling may be induced. The stray light noise may be induced by a portion of the incoming light 132a (FIG. 1) unintentionally entered into the silicon chip 120. The stray light may generate electron and hole pairs that are typically converted into an electrical noise.

As will be discussed in connection with FIGS. 4A-4H, the polycrystalline silicon layers, namely Poly-1, -2, and -3 layers, and metal layers of the chip 120 may be laid out to minimize/suppress the noise. Each of these layers may be separated from its neighboring layers in the z-direction (FIG. 1) by suitable filling materials and formed by use of conventional semiconductor processing techniques.

Figures 4A, 4B:
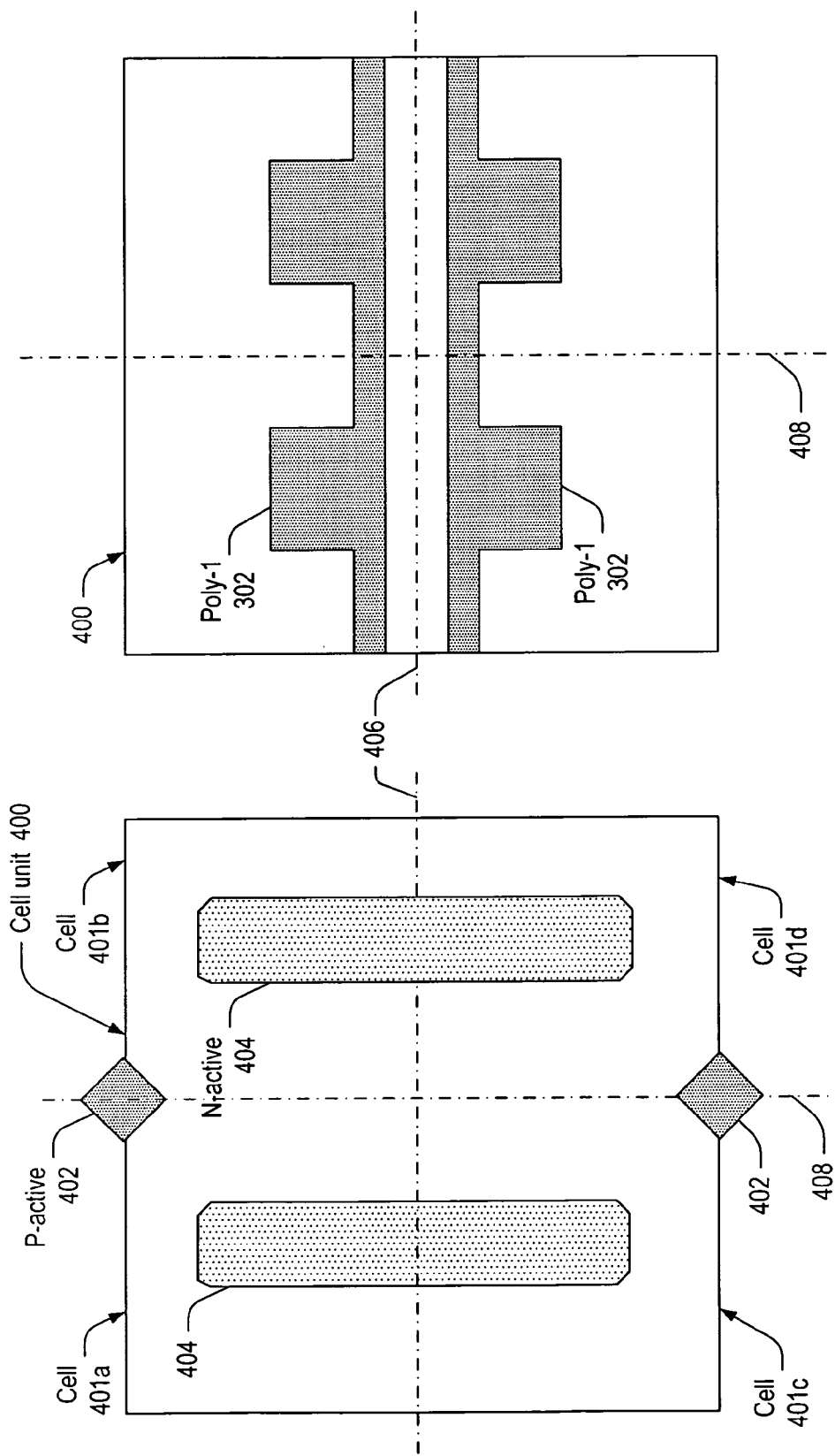
FIG. 4A is a top view of a Nano-LCoS cell unit that includes four Nano-LCoS cells, illustrating N- and P-active layers of the unit in accordance with the present invention.
FIG. 4B is a top view of a Poly-1 layer formed over the N- and P-active layers in FIG. 4A in accordance with the present invention.

FIG. 4A is a top view of high voltage N-active 404 and P-active 402 contained in a Nano-LCoS cell unit 400 having four neighboring Nano-LCoS cells 401a- 401d in accordance with the present invention. The N-active 404 and P-active 402 may be disposed over a silicon substrate. As illustrated, the four neighboring cells 401a-401d may be defined by two lines 406 and 408, where the pixel array located under the pixel area 202 (FIG. 2) may include a plurality of the cell units 400 in a matrix form. The high-voltage N-active 404 may be the source of the transistor 306 (FIG. 3) and the P-active 402 may function as a P-sub tap. As will be explained later, the high-voltage N-active 404 and P-active 402 may be connected to other layers of the cells 401a-401d by use of connection mechanisms extending in the z-direction (FIG. 1). It is noted that each P-active 402 may be positioned over the corners of four neighboring cells, while each N-active 404 may be positioned over two neighboring cells, such as 401b and 401d.

FIG. 4B is a top view of a Poly-1 layer (or, shortly, Ploy-1) 302 formed over the P-, N-active layer in FIG. 4A. The Poly-1 302 may correspond to the gate of the transistor 306 (FIG. 3) and function as a word line. It is noted that a filling material may be deposited between the P-active/N-active layer and the Poly-1 layer 302, even though the filling layer is not shown in FIG. 4B for simplicity.

Figures 4C, 4D:
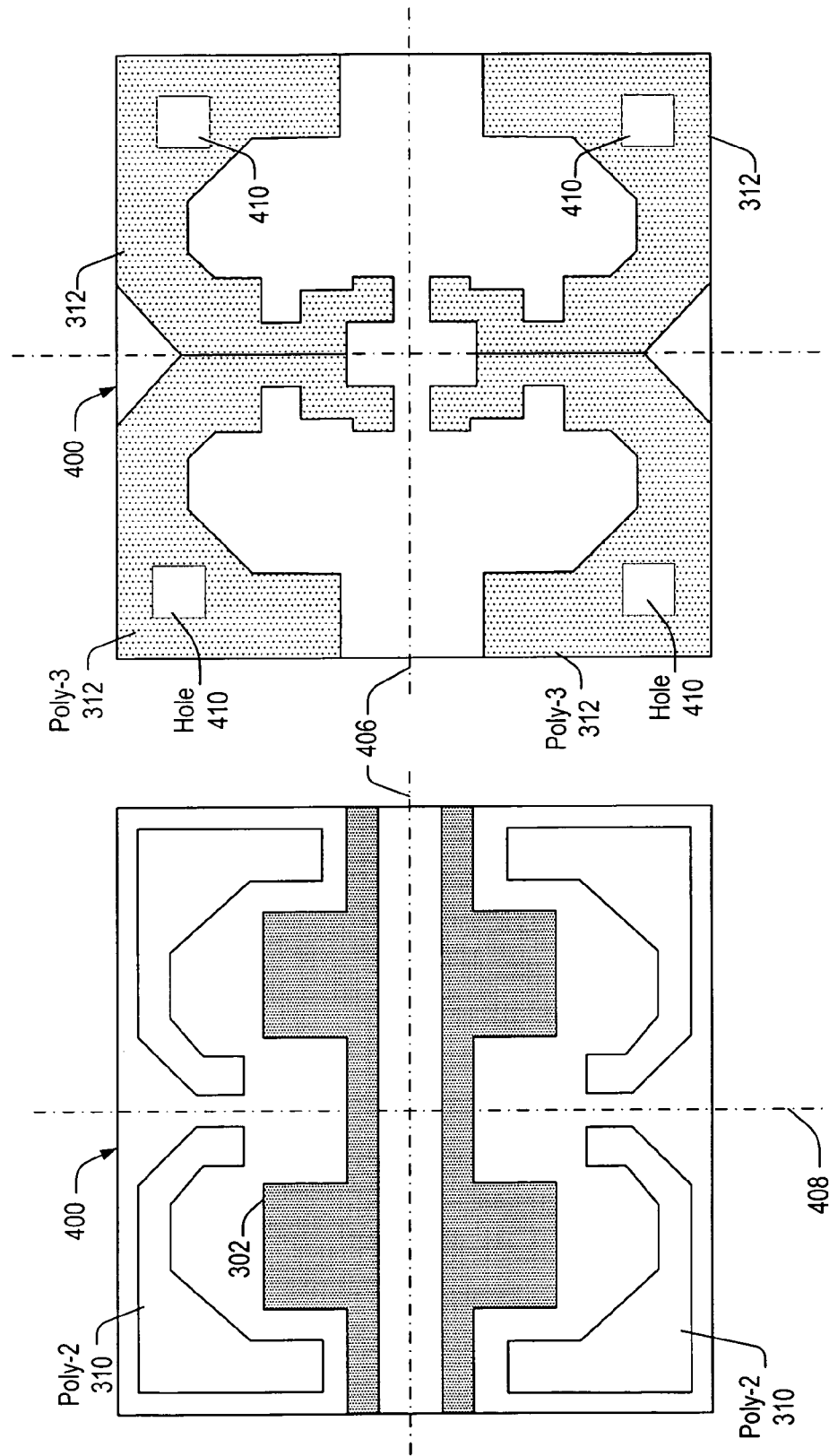
FIG. 4C is a top view of a Poly-2 layer formed over the Poly-1 layer in FIG. 4B in accordance with the present invention.
FIG. 4D is a top view of a Poly-3 layer formed over the Poly-2 layer in FIG. 4C in accordance with the present invention.

FIG. 4C is a top view of a Poly-2 layer (or, shortly, Poly-2) 310 formed over the Ploy-1 layer 302. As depicted, when viewed from the top, the shape and location of the Poly-1 302 may be determined to avoid any overlap with the Poly-2 310 obviating the electrical noise due to the cross-talk therebetween.

FIG. 4D is a top view of a Ploy-3 layer (or, shortly, Poly-3) 312 formed over the Poly-2 layer 310 in FIG. 4C. Each Poly-3 312 may have a hole 410 to form a passage for a connection (more specifically, a connect 434 in FIG. 4E) between the Poly-2 310 and the node 314 shown in FIG. 4E. As illustrated in FIG. 3, the Poly-2 310 and Poly-3 312 may form a capacitor 308, where the Poly-2 310 may function as a capacitor storage node (one of the capacitor plates of the capacitor 308).

FIG. 4E illustrates a Metal-1 layer (or, shortly, Metal-1) shown at 413 that is formed over the Poly-3 layer 312 in FIG. 4D. As depicted, the Metal-1 413 contained in the Nano-LCoS cell unit 400 may include: two bit lines 304; a grounded bit line shield 432 for shielding cross-talk between the two bit lines 432; four nodes 314, each node being connected to the Poly-2 310 and N-active 404 through Vias or contacts 434 and 436, respectively; and two grounded node shields 430 for shielding cross-talk between the bit lines 304 and the nodes 314. The contacts 439 may connect the bit line shield 432 to the P-active 402 (FIG. 4A) providing a ground to the P-active 402. The contacts or Vias 438 may connect the bit lines 304 to the N-active 404 in FIG. 4A.

As discussed, each node 314 may include two contacts 434 and 436 for connecting to the Poly-2 310 and N-active 404, respectively. As the nodes 314 are located in proximity to the bit lines 304, the bit line 304 may interact with the nodes 314 to induce a noise. The noise may be transferred to the Poly-2 310 via the contact 434 and, as a consequence, the voltage level of the cell capacitor 308 (FIG. 3) may be perturbed. Each node shield 430 may be grounded and interposed between the bit line 304 and nodes 314, suppressing the coupling or interaction between the bit line 304 and nodes 314. It is noted that the filing layer may be deposited between the Poly-3 layer and Metal-1 layer. But, for simplicity, the filling layer is not shown in FIG. 4E.

FIG. 4F is a top view of a Metal-2 layer 440 formed over the Metal-1 layer 431 in FIG. 4E. The Metal-2 layer 440 may prevent stray light from entering into the layers below the Metal-2 layer 440. The stray light is a portion of the incoming light 132a (FIG. 1) that enters into the silicon chip 120 through the gap in a Metal-3 layer (shown in FIG. 4G). The stray light may generate electron and hole pairs that are typically converted into electrical noise. As depicted in FIG. 4F, most of the Nano-LCoS cell unit 400 may be covered by the Metal-2 440 so that most of the stray light is blocked. The Metal-2 layer 440 may be respectively connected to the bit line shield 432 and node shield 430 of the Metal-1 layer 431 through Via-1 446 and Via-2 448. The Metal-2 layer 440 may also include nodes 442 for accommodating Via-3 444 that connect the nodes 314 of the Metal-1 layer 431 to the Metal-3 layers 316 (FIGS. 3 and 4G).

FIG. 4G is a top view of a metal layer shown at 452 that includes four Metal-3 layers (or, shortly, Metal-3) 316 formed over the Metal-2 layer 440 in FIG. 4F. Each Metal-3 layer 316 may correspond to one of the four Nano-LCoS cells 401a-401d in the cell unit 400. The voltage difference between each Metal-3 316 and the ITO layer 110 (FIG. 1) may change the optical characteristics of the liquid crystal column over the Metal-3 316, forming a pixel of an image generated over the pixel area 202. Each Metal-3 316 may include a Via-4 450 that is connected to the node 314 (FIGS. 3 and 4E). It is noted that each Metal-3 layer 316 is separated from neighboring Metal-3 layers by a gap that may provide a passage of the stray light into the layers described in FIGS. 4A-4F. As discussed above, the stray light may be blocked by the Metal-2 440 (FIG. 4F), wherein the Metal-2 layer 440 may cover most of the cell unit 400 blocking the stray light that otherwise proceeds toward the Metal-1 layer 413.

FIG. 4H is a top view of the Poly-1 layer 302, Poly-3 layer 312 and bit lines 304 of the Metal-1 layer 431 depicted in FIGS. 4B, 4D and 4E, respectively. The bit lines 304 may extend in a direction normal to the word lines 302 (or, equivalently, Poly-1) to minimize the overlap therebetween and thereby to reduce the cross-talk noise. As depicted in FIG. 4H, the regions 460 indicate the area where the bit lines 304 overlap the word lines 302 in the z-direction (or, equivalently, vertical direction). The overlap regions 460 may be further shielded by the Poly-3 406, wherein the Poly-3 layer 312 may be interposed between the Poly-1 layer (word lines) 302 and bit lines 304.

It should be understood, of course, that the foregoing relates to exemplary embodiments of the invention and that modifications may be made without departing from the spirit and scope of the invention as set forth in the following claims.

What is claimed is:

1. A liquid crystal on silicon (LCoS) chip comprising:
a silicon substrate having an array of memory cells formed thereon, each said memory cell including an N-active and a P-active;
a first polycrystalline silicon layer disposed over said silicon substrate forming a plurality of word lines extending in parallel across said memory cells;
a second polycrystalline silicon layer disposed over said first polycrystalline silicon layer and forming a plurality of first capacitor plates disposed above regions of said substrate not covered by said word lines;
a third polycrystalline silicon layer disposed over said second polycrystalline silicon layer and including a plurality of second capacitor plates disposed above said first capacitor plates, said first and second capacitor plates forming capacitor storage nodes of said memory cells;
a first metal layer disposed above said third polycrystalline silicon layer and forming a plurality of bit lines extending in parallel across said memory cells, said bit lines being directed orthogonal to said word lines, said first metal layer including a plurality of node shields and a plurality of first connecting nodes that is coupled to said second polycrystalline silicon layer and said N-actives, each of the node shields surrounding one of the first connecting nodes to reduce cross-talk between the bit lines and said capacitor storage nodes, said first metal line further including a plurality of bit line shields for reducing cross-talk between said bit lines;
said third polycrystalline silicon layer including shield portions located between the intersections of said bit lines and word lines thereby reducing cross-talk therebetween;
a second metal layer for blocking stray light entered into said memory cells and including a plurality of second connecting nodes, each of said second connecting nodes being coupled to one of said first connecting nodes; and
a third metal layer for applying electrical potentials to liquid crystal located over the memory cells and thereby forming an image in the liquid crystal, said third metal layer including a plurality of contacts for connecting said third metal layer to said second connecting nodes.

2. A liquid crystal on silicon (LCoS) chip comprising:
a silicon substrate having an array of memory cells formed thereon;
a first polycrystalline silicon layer disposed over said silicon substrate and forming a plurality of word lines extending in parallel across said memory cells;
a first metal layer disposed above said first polycrystalline silicon layer and forming a plurality of bit lines extending in parallel across said memory cells, said bit lines being directed orthogonal to said word lines; and
a second polycrystalline silicon layer disposed between said first polycrystalline silicon layer and said first metal layer and having shield portions located between the intersections of said bit lines and word lines, wherein said second polycrystalline layer includes a first plurality of first capacitor plates;
a third polycrystalline silicon layer disposed between said first and second polycrystalline silicon layers and forming a second plurality of second capacitor plates disposed below said first capacitor plates and above regions of said silicon substrate not covered by said word lines, said first and second capacitor plates forming capacitor storage nodes of said memory cells,
wherein cross-talk between the word lines and the bit lines is reduced.

3. A liquid crystal on silicon (LCoS) chip as recited in claim 2, wherein each of said memory cells includes an N-active and a P-active formed over said silicon substrate.

4. A liquid crystal on silicon (LCoS) chip as recited in claim 3, wherein the said first metal layer includes a plurality of node shields for reducing cross-talk between said bit lines and said capacitor storage nodes.

5. A liquid crystal on silicon (LCoS) chip as recited in claim 3, wherein said first metal layer includes a plurality of node shields and a plurality of first connecting nodes that are respectively coupled to both said third polycrystalline silicon layer and said N-active and wherein each of said node shields surrounds one of the first connecting nodes and thereby reducing cross-talk between said bit lines and said capacitor storage nodes.

6. A liquid crystal on silicon (LCoS) chip as recited in claim 3, wherein said N-active is coupled to one of said bit lines.

7. A liquid crystal on silicon (LCoS) chip as recited in claim 2, wherein said first metal layer includes a plurality of bit line shields, each of said bit line shields being disposed between adjacent two of said bit lines and thereby reducing cross-talk therebetween.

8. A liquid crystal on silicon (LCoS) chip as recited in claim 7, wherein each of said memory cells includes an N-active and a P-active that is coupled to one of said bit line shields.

9. A liquid crystal on silicon (LCoS) chip as recited in claim 5, further comprising a second metal layer for blocking stray light entered into said memory cells.

10. A liquid crystal on silicon (LCoS) chip as recited in claim 9, wherein said second metal layer includes a plurality of second connecting nodes, each of said second connecting nodes being coupled to one of said first connecting nodes.

11. A liquid crystal on silicon (LCoS) chip as recited in claim 9, wherein said first metal layer includes a plurality of bit line shields for reducing cross-talk between adjacent two of said bit lines and wherein said second metal layer includes a plurality of contacts for coupling said second metal layer to said bit line shields.

12. A liquid crystal on silicon (LCoS) chip as recited in claim 10, further comprising a third metal layer for applying electrical potentials to liquid crystal located over the memory cells and thereby forming an image in the liquid crystal.

13. A liquid crystal on silicon (LCoS) chip as recited in claim 12, wherein said third metal layer includes a plurality of contacts for connecting said third metal layer to said second connecting nodes.

14. A liquid crystal on silicon (LCoS) chip comprising:
   a silicon substrate having an array of memory cells formed thereon; and
   a first metal layer deposited over the silicon substrates and including a plurality of bit lines and a plurality of bit line shields, each of said bit line shields reducing cross-talk between adjacent two of the bit lines and being grounded;
   a first polycrystalline silicon layer disposed between said silicon substrate and said first metal layer forming a plurality of word lines extending in parallel across said memory cells, said word lines being directed orthogonal to said bit lines;
   a second polycrystalline silicon layer deposited between said first polycrystalline silicon layer and said first metal layer and having shield portions located between the intersections of said bit lines and word lines and a plurality of first capacitor plates; and
   a third polycrystalline silicon layer deposited between said first and second polycrystalline silicon layers and forming a plurality of second capacitor plates disposed below said first capacitor plates and above regions of said substrate not covered by said word lines, said first and second capacitor plates forming capacitor storage nodes of the memory cells.

15. A liquid crystal on silicon (LCoS) chip as recited in claim 14,
   wherein said first metal layer includes a plurality of node shields and a plurality of connecting nodes coupled to said third polycrystalline silicon layer and wherein each of the node shields surrounds one of the connecting nodes to reduce cross-talk between the bit lines and said capacitor storage nodes.

16. A liquid crystal on silicon (LCoS) chip as recited in claim 15, further comprising a plurality of filling layers respectively interposed between said silicon substrate, first polycrystalline silicon layer, second polycrystalline silicon layer and metal layer.

* * * * *